J. FORBES.

Skates.

No. 5,749.

Reissued Feb. 3, 1874.

Witnesses:

Sam. Fro. Smith

James H. Hunter

Inventor:

John Forbes

AM. PHOTO-LITHOGRAPHIC Co. N.Y. (OSBORNE'S PROCESS)

UNITED STATES PATENT OFFICE.

JOHN FORBES, OF HALIFAX, NOVA SCOTIA.

IMPROVEMENT IN SKATES.

Specification forming part of Letters Patent No. 66,316, dated July 2, 1867; reissue No. 5,749, dated February 3, 1874; application filed June 23, 1873.

*To all whom it may concern:*

Be it known that I, JOHN FORBES, of Halifax, in the Province of Nova Scotia, have invented certain new and useful Improvements in Skates; and I do hereby declare that the following is a full, clear, and exact description thereof, reference being had to the accompanying drawings forming a part of this specification.

My invention consists, first, in the application of a hand-lever to the sole and heel clamping mechanisms of a skate, such mechanisms being connected with each other and with the hand-lever at the central portion of the skate, or nearly so, by means of an adjustable and floating hinge or joint, so that the sole and heel clamps are more efficiently controlled in being closed and opened, or in being adjusted to each other; second, in slotted lugs, separately capable of adjustment to the width of sole they are required to grasp and release by means of pinching-screws and bolts, so that they may be automatically operated to grasp and release any given width of sole; third, in a hand-lever, constructed and arranged as hereinafter described, when combined with a latch or catch at its outer end to secure it to the runner when the skate is clamped to the boot or shoe.

Figure 1:
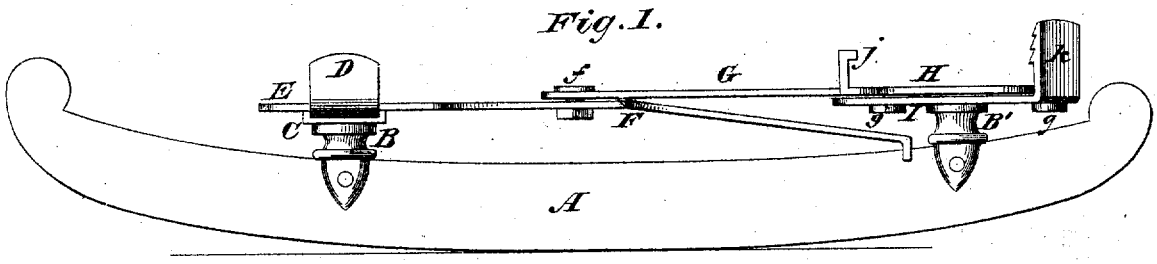
Figure 2:
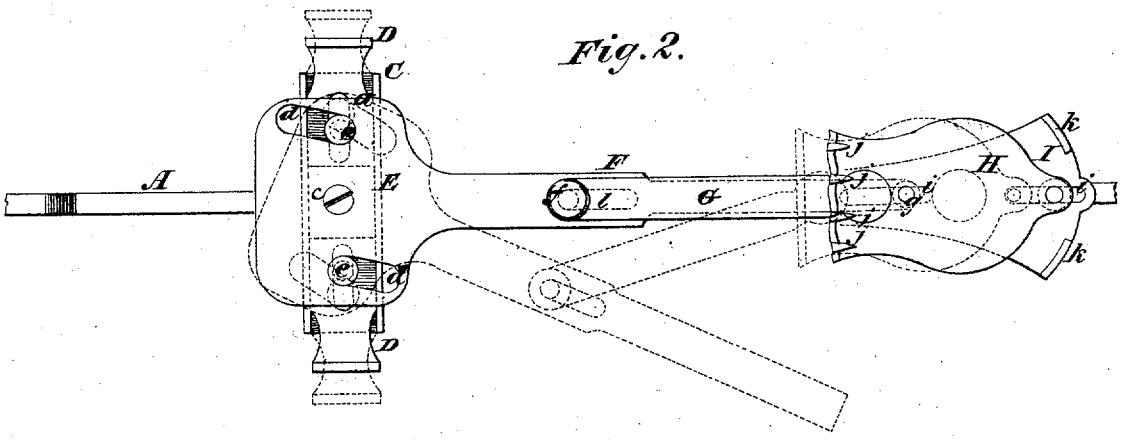
Figure 3:
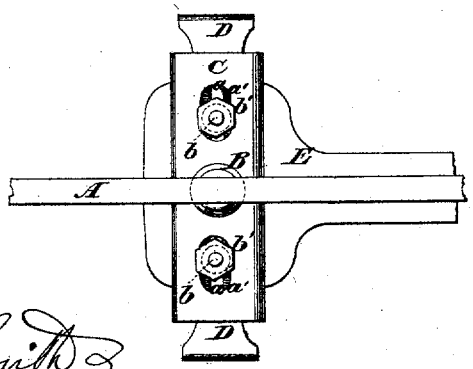

In the drawings serving to illustrate my improvements, Figure 1 is a side view of a skate constructed according to my invention. Fig. 2 is a plan view of same. Fig. 3 is a view of the under side of the box containing the lugs, bolts, and pinching-screws.

A represents the runner. B B′ are two posts or standards. To the front post B, at its upper end, there is secured, horizontally and transversely, a guide-box, C, of oblong form, and composed of a metal plate bent upward at its front and rear sides, and in this box two lugs, D D, are placed and allowed to slide freely. These lugs are also of metal, and of right-angular form, their lower horizontal parts being fitted in the box C, and their upper or vertical parts serrated at their inner surfaces, so that they may grasp firmly the sides of the sole of the boot or shoe. The lugs D D have each an oblong slot, *a*, made in their lower horizontal parts, and similar slots *a′* are made in the bottom of the box C, for bolts *b*, secured by pinching-screws *b′* to pass through, said bolts serving as guides for the lugs, and the bolts and oblong slots admitting of the lugs being adjusted farther in or out, to suit the width of the sole of the boot or shoe to which the skate is to be applied. E represents a plate, which is secured by a screw or pivot bolt, *c*, to the center of the box C, and has two slots, *d d*, made in it, slightly curved, one in advance and the other in rear of the line of the screw or pivot bolt *c* and heads *e*, which heads are on the bolts *b* and fitted in the slots *d d*. It will be seen, from the above description, that by turning the plate E, both of the lugs D D will be moved either outward from or inward toward each other. The plate E is formed with a lever, F, which extends toward the rear of the runner, and is connected by a bolt, *f*, with an arm, G, the rear end of which is made in circular form to fit into a correspondingly-shaped recess in a sliding plate, H, which is secured to a heel-plate, I, attached to the rear post B′, the plate I being provided with pendent pins *g* to work in oblong slots *i* in the heel-plate and serve as guides for the same. The front end of the plate H is bent upward, and provided with teeth *j* projecting backward to penetrate the front side of the heel of the boot or shoe; while the rear end of the heel-plate I is provided with two fixed jaws, *k k*, one at each side, against which the rear of the heel bears. When the lever F is turned or moved to one side, as indicated in dotted lines in Fig. 2, the lugs D D will be moved outward, and the plate H drawn forward, and the skate is then adjusted to the sole and heel of the boot or shoe; the lever F is then moved back toward, and until it is in line with, the runner A, the rear end of said lever having a latch or catch made in it to take into the top of the runner. The adjustment of the lever F throws the plate H backward, so that the heel of the boot or shoe will be firmly clamped, while the lugs D D, being simultaneously drawn inward, firmly grasp the sides of the sole. The plate H may be adjusted farther forward or backward, to suit the size of the heel of the boot or shoe, by moving the double-headed screw-bolt *f*, which operates as a floating hinge or joint along the oblong slot *l* of the lever F.

I claim—

1. The combination of a hand-lever, constructed, substantially as described, with sole and heel clamping mechanisms, such mechanisms being connected with each other and with the hand-lever at the central portion of the skate, or nearly so, by means of an adjustable and floating hinge or joint, substantially as described.

2. The hand-lever, in combination with the heel-grasping mechanism, when the two are connected, in the manner described, by a screw bolt and slot, so as to be adjusted and operated substantially as specified.

3. The slotted lugs arranged in connection with bolts and pinching-screws, substantially as specified, so that the lugs may be separately adjusted, and also be automatically operated to grasp and release any given width of sole, substantially as described.

4. The slotted lugs, constructed substantially as described, in combination with the centrally-pivoted plate, arranged to operate substantially in the manner specified.

5. A hand-lever, constructed and arranged as described, in combination with a latch or catch at its outer end for securing the same to the runner when the skate is clamped to the boot or shoe.

JOHN FORBES.

Witnesses:
JAMES H. HUNTER,
SAML. TRO. SMITH.